United States Patent
Conover et al.

[11] Patent Number: 5,865,430
[45] Date of Patent: Feb. 2, 1999

[54] ALIGNMENT CLAMP AND METHOD FOR ITS USE

[75] Inventors: Richard A. Conover; Michael S. Conover, both of Bartlesville, Okla.

[73] Assignee: K. C. Welding & Machine Corp., Bartlesville, Okla.

[21] Appl. No.: 533,867

[22] Filed: Sep. 26, 1995

[51] Int. Cl.⁶ .................................................. B25B 1/20
[52] U.S. Cl. ........................... 269/43; 29/272; 228/49.3
[58] Field of Search ............................ 269/43; 228/44.5, 228/49.1, 49.3; 29/272, 281.1, 281.5, 282, 464

[56] References Cited

U.S. PATENT DOCUMENTS

| | | | |
|---|---|---|---|
| 2,127,828 | 8/1938 | Milton | 113/102 |
| 2,167,887 | 8/1939 | Graham et al. | 113/102 |
| 2,433,760 | 12/1947 | Janes | 269/130 |
| 2,649,632 | 8/1953 | Kessler | 269/130 |
| 2,846,968 | 8/1958 | Tipton | 29/281.5 |
| 3,400,872 | 9/1968 | Rogers | 228/44 |
| 3,414,950 | 12/1968 | Phariss | 269/43 |
| 3,422,519 | 1/1969 | Fehlman | 29/200 |
| 3,571,908 | 3/1971 | Pilia | 29/493 |
| 3,894,326 | 7/1975 | Merriman | 29/200 P |
| 3,920,232 | 11/1975 | Clark | 269/25 |
| 3,979,814 | 9/1976 | LaJoie et al. | 29/272 |
| 4,079,493 | 3/1978 | Øygarden et al. | 29/272 |
| 4,586,647 | 5/1986 | Dearman | 228/49.3 |
| 4,666,138 | 5/1987 | Dearman | 269/43 |
| 4,750,662 | 6/1988 | Kagimoto | 228/44.5 |
| 5,052,608 | 10/1991 | McClure | 228/44.5 |
| 5,118,024 | 6/1992 | McClure | 228/44.5 |

FOREIGN PATENT DOCUMENTS

359232698  12/1984  Japan .

OTHER PUBLICATIONS

"General Pipeline Clamps", Catalog No. 8002, General Manufacturer Inc., Okmulgee, Ok.

Primary Examiner—Robert C. Watson
Assistant Examiner—Thomas W. Lynch
Attorney, Agent, or Firm—William R. Sharp

[57] ABSTRACT

An alignment clamp for aligning a pair of tubular members in a fixed, end to end relationship comprises a first clamp section having a pair of substantially semiannular first clamp members with first latch ends and first pivot ends, a second clamp section having a pair of substantially semiannular second clamp members with second latch ends and second pivot ends pivotally connected to the first pivot ends, and a latch mechanism operable by a hand lever to releasably engage recessed surfaces at each of the first and second latch ends. According to another aspect of the invention, a method of aligning a pair of tubular members in a fixed, end to end relationship employs clamping fingers which project from clamp members of the first and second clamp sections.

15 Claims, 3 Drawing Sheets

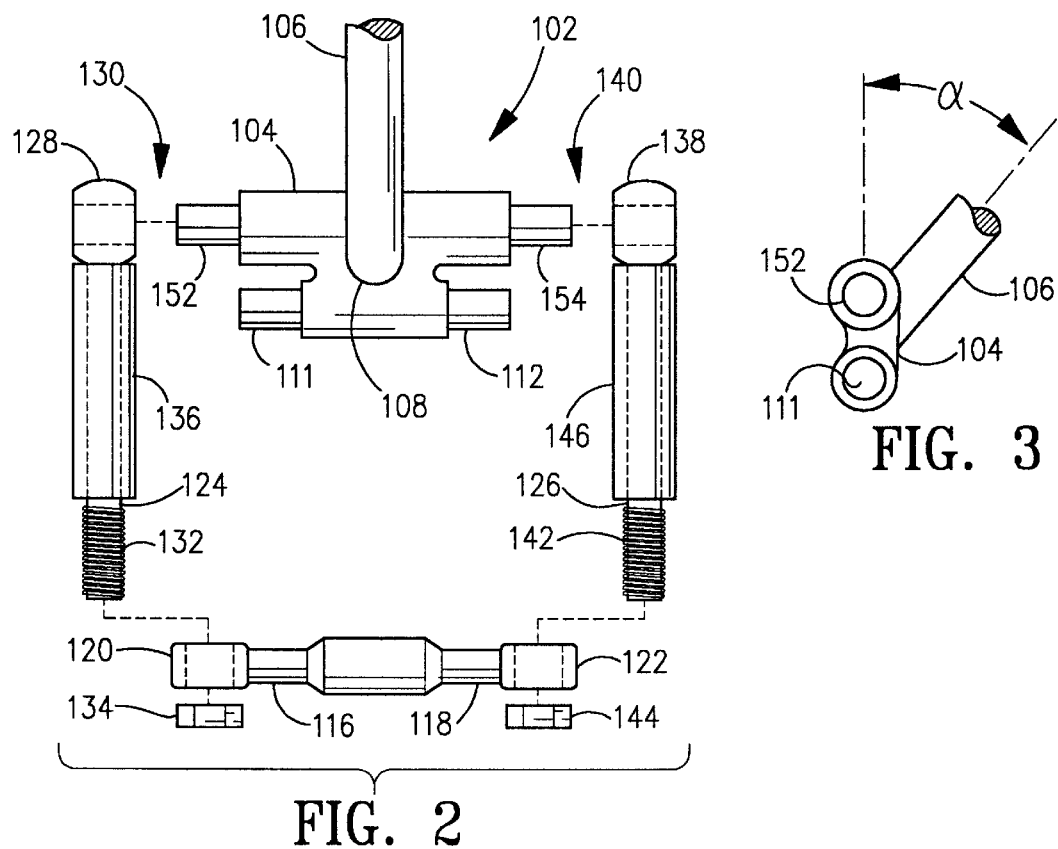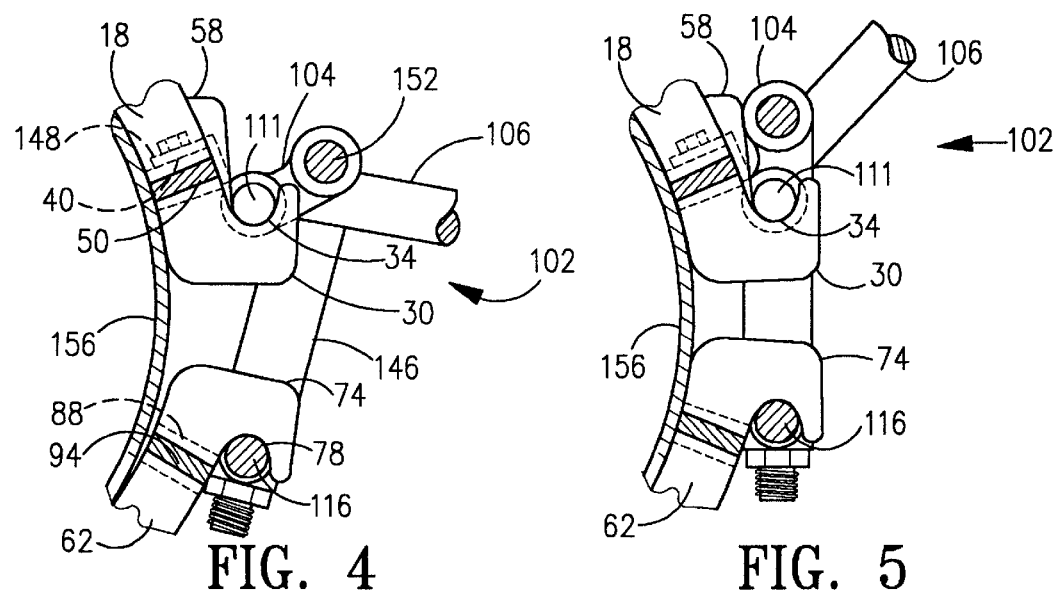

ALIGNMENT CLAMP AND METHOD FOR ITS USE

BACKGROUND OF THE INVENTION

The invention relates to a clamp for aligning a pair of tubular members (i.e. pipes) in a fixed, end to end relationship, and further relates to a method for using the clamp. According to typical practice, once the tubular members are so aligned, the ends can be welded together.

The type of alignment clamp heretofore used most extensively comprises a pair of clamp sections, where each clamp section includes a pair of longitudinally spaced, semiannular members; a number of cross bars having their outer surfaces welded to the inner surfaces of the semiannular members; and a latch mechanism for latching the clamp sections in clamped engagement with a pair of aligned tubular members. The clamp sections have ends that are pivotally connected, and opposing ends that are drawn together by the latch mechanism to latch the clamp around the aligned tubular members. Various latch mechanisms have been employed, including a hydraulic jack, bolts and nuts, a ratcheted screw, and a mechanism operable by a hand lever.

With regard to the latch mechanism, the hydraulic jack, bolts and nuts, and ratcheted screw are very slow to operate in moving from an unlatched to a latched position. Furthermore, each of the hydraulic jack and ratcheted screw are relatively expensive, and can be easily tightened too far by an operator to result in deformation of the tubular members or damage to the clamp. The hand lever mechanism overcomes these problems in being quick to operate, simple and inexpensive in construction, and in providing a fixed stroke of the hand lever that limits the clamping force exerted by the mechanism. These attributes make the hand lever mechanism particularly suitable for use in aligning tubular members of relatively small diameters of 12 inches or less, where speed of operation is desirable and excessive clamping force is to be avoided.

One problem with the prior hand lever mechanisms, however, is the undesirably large friction-bearing surface areas, or those surface areas in frictional contact during operation. This problem is due to a typical design employing a shaft integrally connected to the hand lever and permanently but rotatably mounted in a sleeve at the latching end of one clamp section. Tie rods have ends pivotally and eccentrically (off-center) connected to respective ends of the shaft, and further have opposing ends secured to a latch bar. The latch bar is adapted to engage recessed surfaces at the latching end of the other clamp section. Rotation of the shaft by manipulation of the hand lever draws the latch bar toward the shaft, thereby urging the latching ends of the clamp sections toward one another. The shaft must necessarily have a diameter larger than the distance of movement of the latch bar relative to the shaft when moving from the unlatched to the latched position, thus contributing to the large friction-bearing surface areas of the shaft outer surface and the sleeve inner surface. This problem is compounded by the dirty and gritty conditions in the field which generally worsen the frictional resistance encountered in operation, thereby requiring more effort on the part of the operator and consequent slower operation of the latch mechanism.

Other problems with the above-described prior alignment clamp include: undesirable accessibility to the "weld areas" between the semiannular members of the clamp sections; contact of only the cross bars with exterior surfaces of the tubular members, thus contributing to the possibility of deformation of the tubular members and instability of the clamp as engaged with the tubular members; inability to clamp tubular members with their ends outside the areas between the semiannular members of the clamp sections, which can be desirable when one of the tubular members is a pipe fitting having a neck length insufficient to extend into such areas or when obstructions prevent positioning of the clamp relative to the tubular members so as to permit positioning of their ends in such areas; and labor intensive and costly weldment construction.

SUMMARY OF THE INVENTION

It is, therefore, an object of the invention to provide an alignment clamp having a latch mechanism which employs a hand lever and minimizes the friction-bearing surface areas in order to optimize the speed and ease of operation.

It is another object of the invention that such alignment clamp optimizes accessibility to the weld areas.

It is also an object of the invention that such alignment clamp provides optimum clamping stability and also minimizes the chance of deformation of the tubular members being clamped.

It is another object of the invention that such alignment clamp is capable of clamping tubular members such that their ends are positioned outside the areas between semiannular members of the clamp sections.

It is yet another object of the invention that clamp sections of such clamp employ an alternative to weldment construction.

It is a final object of the invention to provide a method of using the clamp to align a pair of tubular members in a fixed, end to end relationship so that such ends are outside areas between the semiannular members of the clamp sections.

In accordance with one aspect of the invention, there is provided a clamp for aligning a pair of tubular members in a fixed, end to end relationship, comprising: a first clamp section having a first longitudinal axis and which includes a first pair of substantially semiannular clamp members, hereafter denoted as first clamp members, and a first connecting means for fixedly connecting the first clamp members in longitudinally spaced relationship so as to allow access to the area between the first clamp members, wherein the first clamp members have respective inner surfaces facing the first longitudinal axis, respective longitudinally aligned first pivot ends, respective longitudinally aligned first latch ends, and respective first recessed surfaces which define a first recess at each of the first latch ends; a second clamp section having a second longitudinal axis and which includes a second pair of substantially semiannular clamp members, hereafter denoted as second clamp members, and a second connecting means for fixedly connecting the second clamp members in longitudinally spaced relationship so as to allow access to the area between the second clamp members, wherein the second clamp members have respective inner surfaces facing the second longitudinal axis, respective longitudinally aligned second pivot ends being pivotally connected to corresponding first pivot ends, respective longitudinally aligned second latch ends, and respective second recessed surfaces which define a second recess at each of the second latch ends; a latch means having a hand lever and which is operable by such hand lever to releasably engage each of the first and second recessed surfaces in a latched position in which the first and second clamp sections are positioned coaxially to define a substantially annular shape; whereby a pair of tubular members having a suitable diameter can be positioned and aligned in a fixed, end to end relationship with such ends of the tubular members longitudinally positioned between the first clamp members and between the second clamp members, the inner surfaces of the first and second clamp members being in clamped engagement with the exterior surfaces of the tubular members adjacent to the ends of the tubular members when the latch means engages the first and second recessed surfaces in the latched position.

A preferred form of the latch means employs at least one first latch pin integrally connected to the hand lever and adapted to engage the first recessed surfaces, at least one second latch pin for engaging the second recessed surfaces, and at least one tie rod for connecting the hand lever to the second latch pin(s). One end of each tie rod is pivotally connected to the hand lever at a pivot joint radially offset from the first latch pin(s), and each tie rod is secured adjacent its other end to the second latch pin(s). The friction-bearing surface areas are minimized by avoiding the use of a large diameter and permanently mounted rotating shaft with its eccentrically located pivot joint. Moreover, the primary friction-bearing surfaces, which are the first recessed surfaces and surfaces of the first latch pin(s), can be separated from one another since a latch mechanism in accordance with the invention is completely detachable from the clamp sections, thus permitting cleaning and lubrication of such surfaces for optimum ease of operation.

A preferred connecting means for each clamp section comprises a pair of cross bars longitudinally extending between each of the clamp members and circumferentially spaced from one another so that one cross bar is closely adjacent to the pivot ends of the clamp members and the other cross bar is closely adjacent to the latch ends of the clamp members. Employing only a pair of cross bars for each clamp section and positioned as described assists in optimizing access to the weld area between the clamp members.

Accessibility to the weld areas is also enhanced by the minimization of the overall thickness or depth (as measured radially) of each clamp section by other preferred features. First, the inner surfaces of the clamp members are flush with the inner surfaces of the cross bars. Second, the limited and fixed clamping force generated by the latch mechanism minimizes the clamp member thickness, as well as width, which is required to avoid fracture.

The flush inner surfaces of the cross bars and clamp members provide another benefit insofar as tubular members being aligned will have their exterior surfaces in clamped engagement with substantially the entire inner surface of each clamp member. This optimally distributes the clamping force around the tubular members to thereby minimize the chance of deformation to the tubular members and also maximize stability of the tubular members relative to the clamp. Deformation of the tubular members is further avoided by the limited and fixed clamping force generated by the latch mechanism.

According to another preferred feature, circumferentially spaced fingers longitudinally project outwardly from the clamp members. Each finger has a longitudinally extending portion and a tapered portion. The tapered portion can be employed to assist in positioning a tubular member with its end between clamp members of the clamp sections by providing a "funneling" action, and the longitudinally extending portion can be placed in clamped engagement with a pair of tubular members having their ends outside the areas between the clamp members.

The clamp sections are preferably of a cast construction, where the clamp members of each clamp section are integral with their corresponding fingers and cross bars. This maximizes the strength of the joints between the cross bars and clamp members, as compared to, for example, a weldment construction. It is, therefore, more feasible to use only a single pair of cross bars to connect the clamp members of a clamp section, as is discussed above. The cast construction is also less labor intensive than a weldment, and can be less costly (particularly when using a ductile iron alloy).

According to another aspect of the invention, there is provided a method for aligning a pair of tubular members in a fixed, end to end relationship, comprising: providing a clamp comprising a first clamp section having a longitudinal axis and including at least one substantially semiannular clamp member having a first latch end and a first pivot end, a second clamp section having a longitudinal axis and including at least one substantially semiannular clamp member having a second latch end and a second pivot end pivotally connected to the first pivot end, at least a pair of circumferentially spaced fingers having respective inner surfaces and longitudinally projecting from at least one clamp member of one clamp section, and at least one finger having an inner surface and longitudinally projecting from another clamp member of the other clamp section in the same direction as said pair of fingers, and a latch means for latching the first and second clamp sections; positioning the tubular members in an end to end relationship with such ends closely adjacent to the inner surfaces of the fingers; latching the clamp, by engaging the first and second latch ends with the latch means, in a latched position in which the first and second clamp sections are positioned coaxially to define a substantially annular shape, the inner surfaces of the fingers being in clamped engagement with exterior surfaces of the tubular members adjacent to the ends of the tubular members to thereby fix the tubular members in said aligned, end to end relationship.

BRIEF DESCRIPITON OF THE DRAWINGS

FIG. 2 is an exploded, disassembled view of the latch mechanism.

FIG. 3 is a side view of a hand lever unit of the latch mechanism.

FIG. 4 is a cross-sectional view of portions of the clamp sections and latch mechanism, where the clamp sections are in engaged with a pipe and the latch mechanism is engaged with the clamp sections in an unlatched position.

FIG. 5 is a cross-sectional view similar to FIG. 4 with the latch mechanism engaged with the clamp sections in a latched position.

DETAILED DESCRIPTION OF THE INVENTION

A preferred embodiment of the invention, as applied to alignment of a pair of pipes or a pipe and a pipe fitting, is described below with reference to the drawings. First, however, several terms will be defined as such terms are used herein and in the appended claims.

The term "tubular member" is broadly defined as any member of which at least a portion thereof is hollow and substantially cylindrical.

The term "pipe" is defined as an elongated tubular member having a pair of open ends and being suitable for conducting a fluid therethrough.

The term "pipe fitting" is defined as a tubular member of which at least a portion thereof has an opening mateable with an open end of a pipe.

The term "annular" is defined as being the shape of a closed and planar curve, which is understood as not being limited to a circle. The term "semiannular" as applied to a member refers to approximately one-half of such curve.

Figure 1:
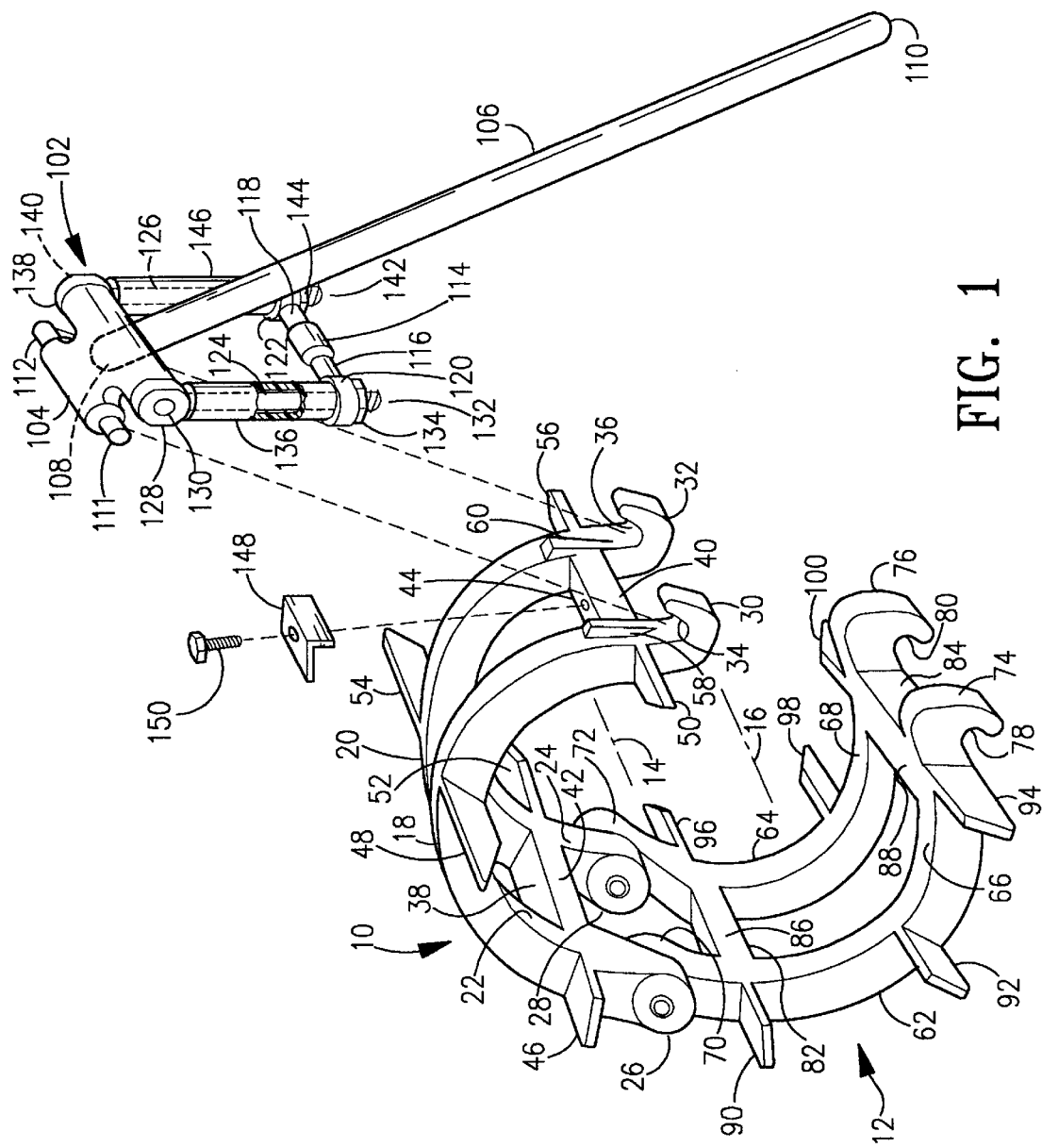
FIG. 1 is a perspective view of a preferred embodiment of a clamp in accordance with the invention, comprising pivotally connected clamp sections and a latch mechanism detached from such clamp sections.

Referring now to FIG. 1, the illustrated clamp sections 10 and 12 are shown as being pivoted to a partially open position with their respective longitudinal axes 14 and 16 separated from one another.

Clamp section 10 includes a pair of substantially semiannular clamp members 18 and 20 having respective inner surfaces 22 and 24 facing longitudinal axis 14, respective longitudinally aligned pivot ends 26 and 28, respective longitudinally aligned latch ends 30 and 32, and respective recessed surfaces 34 and 36 which define corresponding recesses at latch ends 30 and 32. As shown, such recessed surfaces and recesses are preferably hook-shaped. Clamp section 10 further includes a pair of cross bars 38 and 40 for fixedly connecting clamp members 18 and 20 in longitudinally spaced relationship so as to allow access to the area ("weld area") between clamp members 18 and 20. Cross bars 38 and 40 longitudinally extend between each of clamp members 18 and 20 and are circumferentially spaced from one another such that cross bar 38 is closely adjacent to pivot ends 26 and 28 and cross bar 40 is closely adjacent to latch ends 30 and 32. Cross bars 38 and 40 have respective inner surfaces 42 and 44, which face longitudinal axis 14 and are substantially flush with inner surfaces 22 and 24.

As shown, circumferentially spaced fingers 46, 48, and 50 longitudinally project outwardly from clamp member 18, and circumferentially spaced fingers 52, 54, and 56 project outwardly from clamp member 20. Each of such fingers has one end integrally connected to its corresponding clamp member and has an inner surface comprised of a longitudinally extending portion and a tapered portion. The longitudinally extending portion extends from the end of the finger connected to the clamp member, at which the inner surface of the finger is substantially flush with the inner surface of the clamp member, to a boundary between the longitudinally extending portion and tapered portion. The tapered portion extends from such boundary to the other end of the finger outermost from the clamp member.

Finally with respect to clamp section 10, clamp members 18 and 20 have respective stop ribs 58 and 60 projecting from the outer surfaces of such members adjacent to recessed surfaces 34 and 36.

Clamp section 12 is substantially identical in structure to clamp section 10, except that clamp section 12 has no stop ribs associated with its clamp members. As shown, clamp section 12 includes clamp members 62 and 64 having respective inner surfaces 66 and 68 facing longitudinal axis 16, respective longitudinally aligned pivot ends 70 and 72 pivotally connected to corresponding pivot ends 26 and 28 of clamp section 10, respective longitudinally aligned latch ends 74 and 76, and respective recessed surfaces 78 and 80 which define recesses at latch ends 74 and 76. Clamp section 12 further includes cross bars 82 and 84 having respective inner surfaces 86 and 88 facing longitudinal axis 16, and fingers 90, 92, 94, 96, 98, and 100 similarly structured and positioned as corresponding cross bars and fingers of clamp section 10.

With respect to the fingers of clamp sections 10 and 12, it should be understood that, although each clamp member of such clamp sections has an associated three fingers in the illustrated embodiment, it is within the scope of the invention to provide fewer or more fingers than such embodiment as long as at least one clamp member of one clamp section has at least a pair of fingers and another clamp member of the other clamp section has at least one finger longitudinally projecting therefrom in the same direction as the pair of fingers.

With respect to the construction of the clamp sections, clamp members 18 and 20 of clamp section 10 are preferably integral with their corresponding cross bars and fingers, and clamp members 62 and 64 of clamp section 12 are preferably integral with their corresponding cross bars and fingers. In regard to such integral construction, each clamp section is preferably composed of a cast metal such as a steel or ductile iron alloy. An iron alloy, having a carbon content higher than steel alloys, is most preferred as being less costly than a steel casting, and further has physical properties of strength and resiliency that are acceptable for an alignment clamp. Acceptable ranges of such physical properties are an ultimate tensile strength of about 60,000–70,000 psi, a yield strength of about 40,000–50,000 psi, and an elongation of about 10–15%. When using a ductile iron alloy, it is particularly desirable to surface harden the recessed surfaces of the clamp members by heating such surfaces by a suitable means, such as a welding torch, followed by quenching the heated surfaces. If weight of the clamp is an important factor to consider, lighter alternatives such as aluminum alloys could be employed to cast the clamp sections.

The clamp illustrated in FIG. 1 further comprises a latch mechanism 102. Latch mechanism 102 includes a hand lever unit 104 having a hand lever 106, with opposing ends 108 and 110, and a pair of coaxial latch pins 111 and 112 for engaging respective recessed surfaces 34 and 36 within the corresponding recesses. As shown, latch pins 111 and 112 are integrally connected to hand lever 106 adjacent to hand lever end 108 (shown in broken lines). Latch mechanism 102 further includes a latch bar 114 having a pair of latch pin sections 116 and 118 for engaging respective recessed surfaces 78 and 80, an apertured latch bar end 120 integral with latch pin section 116, and an apertured latch bar end 122 integral with latch pin section 118.

Hand lever unit 104 is operably connected to latch bar 114 and its latch pin sections by means of tie rods 124 and 126. Tie rod 124 is received through apertured latch bar end 120, has an eye end 128 pivotally connected to hand lever unit 104 at a pivot joint 130 adjacent to hand lever end 108 and radially offset with respect to latch pin 111, and has a threaded end 132 for receiving a nut 134 thereon to abut apertured latch bar end 120 and thereby secure latch bar 114 to tie rod 124 adjacent to its threaded end 132. A spacer tube 136 (a portion of which is broken away and shown in cross section to reveal tie rod 124 therein) is received over tie rod 124 such that one end of the tube is adjacent to latch bar end 120 and the other end is adjacent to eye end 128. The spacer tube serves to maintain latch bar 114 in its desired position when the clamp is not in use or in the process of use. The spacer tube is preferably a somewhat pliable plastic to permit slight compression thereof if it is desired to adjust the position of latch bar 114 by moving nut 134 toward eye end 128. Such adjustment, or adjustment in the opposite direction, is sometimes desirable for slight variances in the diameter of pipes being aligned, or where the user wants to either increase or decrease the clamping force. Tie rod 126 similarly has an eye end 138 pivotally connected to hand lever unit 104 at a pivot joint 140 (indicated but not visible in the view of FIG. 1), a threaded end 142 for receiving a nut 144 thereon to abut apertured latch bar end 122, and an associated spacer tube 146.

Also shown in FIG. 1 is a retainer 148, which can be removably mounted to cross bar 40 of clamp section 10 by means of a bolt 150 and associated threaded hole in cross bar 40. In assembling the illustrated clamp in preparation for its use, latch mechanism 102 is first positioned so that pins 111 and 112 are engaged with respective recessed surfaces 34 and 36, followed by mounting of retainer 148 to cross bar 40. As will be more apparent from FIG. 4, retainer 148 as so mounted functions to retain latch echanism 102 engaged with clamp section 10. Therefore, the clamp sections and latch mechanism are connected as a single piece of equipment for the convenience of the user in performing a number of pipe alignments. Latch mechanism 102 is completely detachable from clamp section 10, as shown, by simply removing bolt 150 and retainer 148.

Referring now to FIG. 2, this exploded view of latch mechanism 102 shows hand lever unit 104 rotated to a different position than that shown in FIG. 1, and more clearly shows the structure of each of pivot joints 130 and 140. Pivot joints 130 and 140 respectively include pivot pins 152 and 154 integrally connected to hand lever 106 adjacent to hand lever end 108. Pivot pins 152 and 154 have respective ends on opposite sides of hand lever 106, and are oriented to be substantially parallel to latch pins 111 and 112. Tie rod 124 is pivotally connectable to pivot pin 152 at eye end 128 by receiving pivot pin 152 through the aperture of eye end 128 to permit free rotation of pivot pin 152 with respect to eye end 128. Similarly, tie rod 126 is pivotally connectable to pivot pin 154 at eye end 138 by receiving pivot pin 154 through the aperture of eye end 138 to permit free rotation of pivot pin 154 with respect to eye end 138. FIG. 2 also more clearly shows the manner in which the threaded ends 132 and 142 of tie rods 124 and 126 are respectively secured to apertured latch bar ends 120 and 122 by means of nuts 134 and 144.

Referring now to FIG. 3, this side view of hand lever unit 104 shows the angle α defined by the longitudinal axis of hand lever 106 with respect to the plane defined by the longitudinal axes of the latch pins and pivot pins. Angle α is preferably about 30° to about 60°, and most preferably about 45°. As will be more apparent from FIGS. 5 and 6, this angle positions hand lever 106 so as to not obstruct the weld areas when latch mechanism 102 is in the latched position with respect to clamp sections 10 and 12.

With respect to FIGS. 4, 5, and 6, which will now be described, only one clamp member of each clamp section and a portion of the latch mechanism is shown and described. It should be apparent that the same illustration and description would apply to the other clamp members and the remainder of the latch mechanism.

Referring now to FIG. 4, this cross-sectional view illustrates clamp members 18 and 62 partially engaged with a pipe 156, and latch mechanism 102 engaged with the clamp members in an unlatched position. This cross-sectional view is along a line passing through the innermost end of pivot pin 152 and tangential to the outermost ends of latch pin 111 and latch pin section 116. As shown, latch pin 111 is engaged with recessed surface 34 in its corresponding recess, and latch pin section 116 is engaged with recessed surface 78 in its corresponding recess. FIG. 4 also shows retainer 148 (in broken lines) in its mounted position on cross bar 40 (also in broken lines). Retainer 148 has one end engaged with hand lever unit 104 so as to retain latch pin 111 in its engaged position with respect to recessed surface 34, especially when latch pin section 116 is not engaged with recessed surface 78, as would be the case in between alignment operations.

Referring now to FIG. 5, this view is similar to that of FIG. 4, but with latch mechanism 102 engaged with clamp members 18 and 62 in the latched position. In such position, hand lever unit 104 abuts rib stop 58. Accordingly, the rib stop functions to stop the upward rotation of hand lever 106 at the desired position, where the plane defined by the axes of the latch pins and pivot pins is slightly past vertical, and where hand lever 106 does not obstruct the weld areas. In moving from an unlatched position to the latched position, latch pin section 116 is drawn closer to latch pin 111. Consequently, latch end 74 is urged toward latch end 30 to thereby bring clamp members 18 and 62 into fully clamped engagement with the exterior surface of pipe 156.

Figure 6:
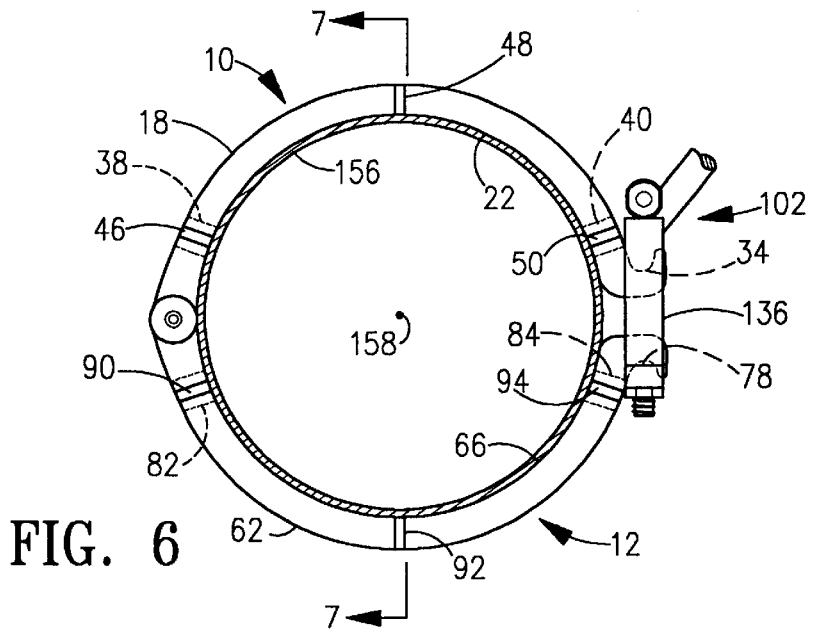
FIG. 6 is a view showing the pipe in cross section and a side view of the clamp in the latched position.

Referring now to FIG. 6, this view shows the entire circumference of pipe 156 in cross section, as well as the entire circumference of each of clamp members 18 and 62 engaged with latch mechanism 102 in the latched position. Clamp members 18 and 62 of respective clamp sections 10 and 12 are positioned coaxially to define a substantially annular shape, and the coincident longitudinal axes 14 and 16 (FIG. 1) are indicated at 158. Recessed surfaces 34 and 78 (shown in broken lines) face in opposite directions substantially perpendicular to the coincident longitudinal axes indicated at 158. Finally, FIG. 6 shows the manner in which the exterior surface of pipe 156 engages substantially the entire inner surface 22 of clamp member 18 and the entire inner surface 66 of clamp member 62.

Figure 7:
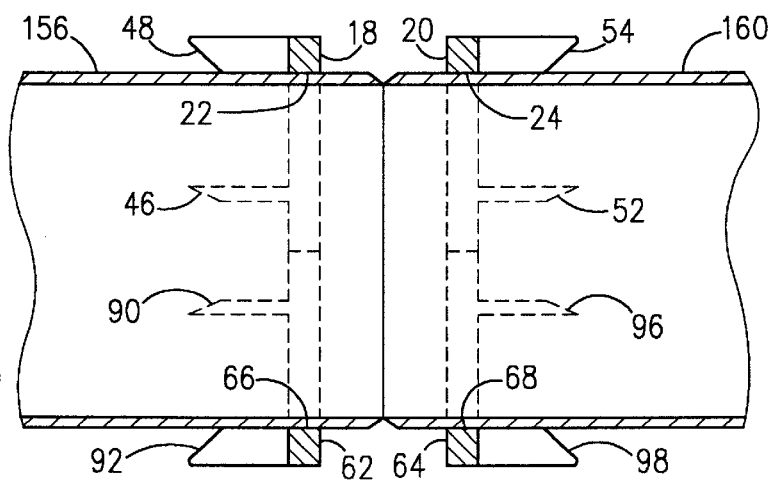
FIG. 7 is a longitudinal, cross-sectional view as viewed along line 7—7 in FIG. 6, which shows a portion of the clamp and the above-mentioned pipe in an aligned to end relationship with another pipe.

Referring now to FIG. 7, this longitudinal cross-sectional view shows the manner in which pipe 156 is aligned in a fixed, end to end relationship with another pipe 160 by means of the illustrated clamp in the latched position. As shown, the ends of pipes 156 and 160 are longitudinally positioned between clamp members 18 and 20 and between clamp members 62 and 64, and inner surfaces 22, 24, 66, and 68 are in clamped engagement with the exterior surfaces of pipes 156 and 160 adjacent to their ends. According to a typical procedure of pipe alignment, one clamp member of each clamp section can be placed around one of the pipes, followed by longitudinal insertion of the other pipe between the other clamp members to place the pipes in an end to end relationship. Such longitudinal insertion can be assisted by the "funneling" action of tapered portions of finger inner surfaces. The latch mechanism is then manipulated by its hand lever to move from an unlatched position to the latched position. The aligned pipes can be welded at the joint defined by the ends of the pipes, and the clamp removed once the ends are welded. Alternatively, the pipes can be positioned in an end to end relationship initially, followed by positioning of the clamp around both pipes simultaneously.

Figure 8:
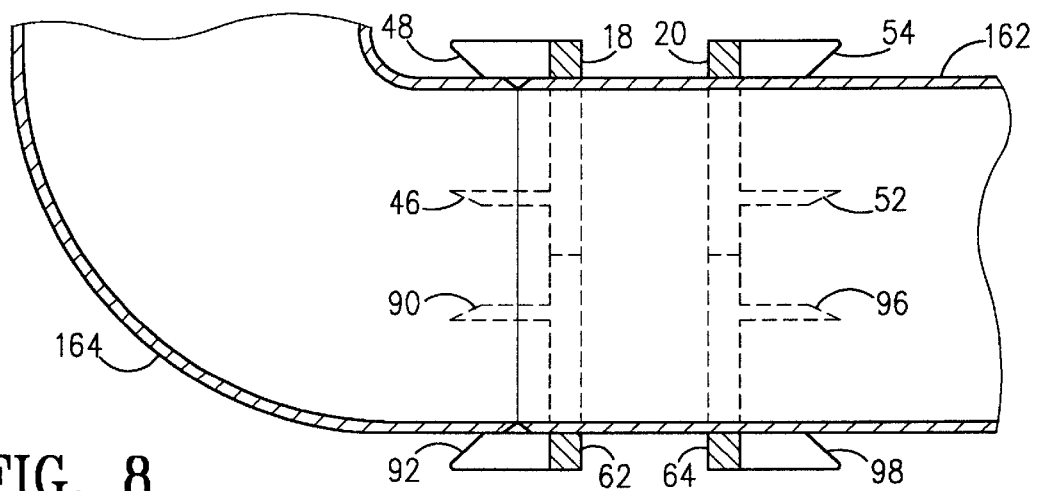
FIG. 8 is a view similar to FIG. 7, but with a pipe aligned with the neck portion of a pipe fitting using clamping fingers of the clamp sections.

Referring now to FIG. 8, this FIGURE shows the use of the previously illustrated and described clamp in the alignment of a pipe 162 and an elbow pipe fitting 164, with the neck portion of pipe fitting 164 being in an aligned, end to end relationship with pipe 162. As shown, the longitudinally extending inner surface portions of fingers 46, 48, 90, and 92 are in clamped engagement with exterior surfaces of pipe 162 and pipe fitting 164 adjacent to the above-mentioned ends. With respect to each such finger, which has an end connected to its clamp member and a boundary between its longitudinally extending portion and tapered portion, the ends of the pipe fitting and pipe are positioned between such end of the finger and such boundary of course, the same would apply to fingers 50 and 94, which are not shown. In addition, fingers 52, 54, 56, 96, 98, and 100 could also be used for clamping similarly. Use of the fingers as described above is useful for aligning a neck portion of a pipe fitting and a pipe, where the neck portion of the pipe fitting is of insufficient length to extend into the areas between the clamp members. Such finger clamping is also useful in the alignment of a pair of pipes when an obstruction prevents positioning the clamp in the manner shown in FIG. 7.

Obviously, many modifications and variations of the present invention are possible in light of the above teachings. It is, therefore, to be understood that within the scope of the appended claims, the invention can be practiced other than as specifically described.

That which is claimed is:

1. A clamp for aligning a pair of tubular members in a fixed, end to end relationship, comprising:

a first clamp section having a first longitudinal axis and which includes a first pair of substantially semiannular clamp members, hereafter denoted as first clamp members, and a first connecting means for fixedly connecting the first clamp members in longitudinally spaced relationship so as to allow access to the area between the first clamp members, wherein the first clamp members have respective inner surfaces facing the first longitudinal axis, respective longitudinally aligned first pivot ends, respective longitudinally aligned first latch ends, and respective first recessed surfaces which define a first recess at each of the first latch ends;

a second clamp section having a second longitudinal axis and which includes a second pair of substantially semiannular clamp members, hereafter denoted as second clamp members, and a second connecting means for fixedly connecting the second clamp members in longitudinally spaced relationship so as to allow access to the area between the second clamp members, wherein the second clamp members have respective inner surfaces facing the second longitudinal axis, respective longitudinally aligned second pivot ends being pivotally connected to corresponding first pivot ends, respective longitudinally aligned second latch ends, and respective second recessed surfaces which define a second recess at each of the second latch ends;

a latch means having a hand lever and which is operable by such hand lever to releasably engage each of the first and second recessed surfaces in a latched position in which the first and second clamp sections are positioned coaxially to define a substantially annular shape, wherein the first recessed surfaces and second recessed surfaces, in the latched position, face in opposite directions substantially perpendicular to the first and second longitudinal axes, and wherein the latch means further comprises at least one first latch pin for engaging the first recessed surfaces within the first recesses and at least one second latch pin for engaging the second recessed surfaces within the second recesses, the hand lever being operably connected to said at least one first and second latch pins and being selectively movable between an unlatched position and the latched position, so that when moving from the unlatched position to the latched position, said at least one first latch pin and said at least one second latch pin are drawn closer to one another to thereby urge the first and second latch ends toward one another, and further wherein the hand lever has opposing ends and said at least one first latch pin is integrally connected to the hand lever adjacent to one end thereof, and wherein the latch means further comprises at least one tie rod having opposing ends and being pivotally connected at one such end to the hand lever at a pivot joint adjacent to said one end of the hand lever but radially offset with respect to said at least one first latch pin, said at least one tie rod also being secured adjacent its other end to said at least one second latch pin, which is parallel to said at least one first latch pin in the latched or unlatched positions;

whereby a pair of tubular members having a suitable diameter can be positioned and aligned in a fixed, end to end relationship with such ends of the tubular members longitudinally positioned between the first clamp members and between the second clamp members, the inner surfaces of the first and second clamp members being in clamped engagement with the exterior surfaces of the tubular members adjacent to the ends of the tubular members when the latch means engages the first and second recessed surfaces in the latched position.

2. A clamp as recited in claim 1 wherein said at least one second latch pin has opposing ends, the pivot joint includes at least one pivot pin, having opposing ends on opposite sides of the hand lever, integrally connected to the hand lever adjacent to said one end thereof so as to be substantially parallel to said at least one first latch pin, and said at least one tie rod comprises first and second tie rods of which the first tie rod is pivotally connected at one end thereof to one end of said at least one pivot pin and is further secured adjacent to the other end thereof to one end of said at least one second latch pin, the second tie rod being pivotally connected at one end thereof to the other end of said at least one pivot pin and being further secured adjacent to the other end thereof to the other end of said at least one second latch pin.

3. A clamp as recited in claim 2 wherein the hand lever has a longitudinal axis which defines an angle of about 30° to about 60° with respect to a plane defined by respective longitudinal axes of said at least one first latch pin and said at least one pivot pin.

4. A clamp as recited in claim 3 wherein the position of said at least one second latch pin as secured to the first and second tie rods is adjustable.

5. A clamp as recited in claim 4, further comprising a retainer means removably mounted to one clamp section for retaining said at least one corresponding latch pin in engagement with the recessed surfaces of said one clamp section.

6. A clamp as recited in claim 5 wherein the latch means is completely detachable from said one clamp section upon removal of the retainer means from its mounted position, thereby making the latch means completely detachable from the first and second clamp sections.

7. A clamp as recited in claim 6 wherein the first and second latch ends and their corresponding first and second recessed surfaces are substantially hook-shaped.

8. A clamp as recited in claim 7 wherein the first connecting means comprises a pair of first cross bars which longitudinally extend between each of the first clamp members and which are circumferentially spaced from one another such that one first cross bar is closely adjacent to the first pivot ends and the other first cross bar is closely adjacent to the first latch ends, and wherein the second connecting means comprises a pair of second cross bars which longitudinally extend between each of the second clamp members and which are circumferentially spaced from one another such that one second cross bar is closely adjacent to the second pivot ends and the other second cross bar is closely adjacent to the second latch ends, whereby access to the area between the first clamp members and the area between the second clamp members is optimized.

9. A clamp as recited in claim 8 wherein each of the first cross bars has an inner surface substantially flush with the inner surface of each first clamp member, and each of the second cross bars has an inner surface substantially flush with the inner surface of each second clamp member, whereby tubular members being aligned in a fixed, end to end relationship will have their exterior surfaces in clamped engagement with substantially the entire inner surface of each of the first and second clamp members.

10. A clamp for aligning a pair of tubular members in a fixed, end to end relationship, comprising:

a first clamp section having a first longitudinal axis and which includes a first pair of substantially semiannular clamp members, hereafter denoted as first clamp members, and a first connecting means for fixedly connecting the first clamp members in longitudinally spaced relationship so as to allow access to the area between the first clamp members, wherein the first clamp members have respective inner surfaces facing the first longitudinal axis, respective longitudinally aligned first pivot ends, respective longitudinally aligned first latch ends, and respective first recessed surfaces which define a first recess at each of the first latch ends;

a second clamp section having a second longitudinal axis and which includes a second pair of substantially semiannular clamp members, hereafter denoted as second clamp members, and a second connecting means for fixedly connecting the second clamp members in longitudinally spaced relationship so as to allow access to the area between the second clamp members, wherein the second clamp members have respective inner surfaces facing the second longitudinal axis, respective longitudinally aligned second pivot ends being pivotally connected to corresponding first pivot ends, respective longitudinally aligned second latch ends, and respective second recessed surfaces which define a second recess at each of the second latch ends;

at least a pair of circumferentially spaced fingers longitudinally projecting outwardly from at least one of the clamp members of one clamp section, at least one finger longitudinally projecting, in the same direction as said pair of fingers, from another clamp member of the other clamp section; each of said fingers having one end integrally connected to its corresponding clamp member and the other end outermost from said corresponding clamp member, and further having an inner surface comprised of a longitudinally extending portion and a tapered portion, the longitudinally extending portion extending from said one end of said finger, at which the inner surface of said finger is substantially flush with the inner surface of said corresponding clamp member, to a boundary between the longitudinally extending portion and tapered portions, the tapered portion extending from said boundary to the other end of said finger;

a latch means having a hand lever and which is operable by such hand lever to releasably engage each of the first and second recessed surfaces in a latched position in which the first and second clamp sections are positioned coaxially to define a substantially annular shape;

whereby a pair of tubular members having a suitable diameter can be positioned and aligned in a fixed, end to end relationship with such ends of the tubular members longitudinally positioned between the first clamp members and between the second clamp members, the inner surfaces of the first and second clamp members being in clamped engagement with the exterior surfaces of the tubular members adjacent to the ends of the tubular members when the latch means engages the first and second recessed surfaces in the latched position, and whereby (i) in the alignment of tubular members where the ends of the tubular members are positioned between the first clamp members and second clamp members, the tapered portions of the finger inner surfaces assist in such positioning of a tubular member, or (ii) the ends of the tubular members being aligned in a fixed, end to end relationship can be positioned, with respect to each finger, between said one end thereof and said boundary such that the longitudinally extending portion of said finger inner surface is in clamped engagement with the exterior surfaces of the tubular members adjacent to the ends of the tubular members.

11. A clamp as recited in claim 10 wherein there are three circumferentially spaced fingers longitudinally projecting outwardly from said at least one clamp member of said one clamp section, and there are three circumferentially spaced fingers longitudinally projecting from said another clamp member of the other clamp section.

12. A clamp as recited in claim 11 wherein the first clamp members of the first clamp section are integral with their corresponding fingers and cross bars, and the second clamp members of the second clamp section are integral with their corresponding fingers and cross bars.

13. A clamp as recited in claim 12 wherein the first and second clamp sections are composed of a cast metal.

14. A clamp as recited in claim 13 wherein the cast metal is a ductile iron alloy.

15. A clamp as recited in claim 13 wherein the cast metal is an aluminum alloy.

* * * * *